United States Patent
Pelczer (10) Patent No.: US 8,312,581 B2
(45) Date of Patent: Nov. 20, 2012

(54) METHOD FOR DETERMINING THE LOAD IN A WASHING MACHINE

(75) Inventor: Andreas Pelczer, Wassertrüdingen (DE)

(73) Assignee: Suspa GmbH, Nuremberg (DE)

( * ) Notice: Subject to any disclaimer, the term of this patent is extended or adjusted under 35 U.S.C. 154(b) by 907 days.

(21) Appl. No.: 11/761,421

(22) Filed: Jun. 12, 2007

(65) Prior Publication Data

US 2007/0283511 A1 Dec. 13, 2007

(30) Foreign Application Priority Data

Jun. 13, 2006 (DE) .......................... 10 2006 027 295

(51) Int. Cl.
*D06F 35/00* (2006.01)

(52) U.S. Cl. .......................................... 8/158; 68/12.04

(58) Field of Classification Search ..... 8/158; 68/12.02, 68/12.04, 12.05, 12.06, 23.1
See application file for complete search history.

(56) References Cited

U.S. PATENT DOCUMENTS

| | | | |
|---|---|---|---|
| 2004/0226321 A1* | 11/2004 | Park et al. | 68/23.1 |
| 2005/0022315 A1* | 2/2005 | Beier et al. | 8/158 |
| 2006/0054440 A1* | 3/2006 | Peuker et al. | 188/381 |

FOREIGN PATENT DOCUMENTS

| | | |
|---|---|---|
| DE | 19847487 C2 | 4/2000 |
| DE | 100 46 712 A1 | 4/2001 |
| DE | 10225335 A1 | 12/2003 |
| DE | 103 34 572 B3 | 8/2004 |
| DE | 10334572 B3 | 8/2004 |
| DE | 10 2005 038 950 A1 | 5/2006 |
| EP | 0 051 491 A1 | 5/1982 |
| EP | 1258556 A1 * | 11/2002 |
| EP | 1502983 A1 | 2/2005 |

OTHER PUBLICATIONS

Machine Translation of Bicker, EP 1258556 A1, Mar. 2002.*
European Search Report mailed Oct. 11, 2007.

* cited by examiner

*Primary Examiner* — Michael Barr
*Assistant Examiner* — David Cormier
(74) *Attorney, Agent, or Firm* — Browdy and Neimark, PLLC (57) ABSTRACT

With a method for determining the load of a washing machine, the load can be determined in a simple and exact manner in that the load is calculated by a comparison between suspension forces of the at least one suspension element and damper forces of the at least one damper with a non-linear characteristic in the unloaded and loaded state of the washing machine.

21 Claims, 5 Drawing Sheets

METHOD FOR DETERMINING THE LOAD IN A WASHING MACHINE

BACKGROUND OF THE INVENTION

1. Field of the Invention

The invention relates to a method for determining the load in a washing machine, in particular a washing machine with a spin gear.

2. Background Art

Methods for determining the load of a washing machine are known and are already used on a large scale in modern washing machines. The weight of the laundry which has been introduced into the washing machine for washing is described as the load. In modern washing machines, the washing process is controlled and optimised as a function of the load. A drawback of known methods is that load determination is often very inaccurate owing to the non-linear damper characteristic, and dampers having a linear characteristic are very much more expensive.

SUMMARY OF THE INVENTION

It is the object of the invention to provide a method for determining the load in a washing machine which allows simple, exact load determination.

This object is achieved by a method for determining the load in a washing machine, comprising the steps of providing a washing machine, with a washing machine casing and a washing unit, at least one suspension element for the oscillatory fastening of the washing unit on the washing machine casing, and at least one damper for damping the movement of the washing unit, the at least one damper comprising a casing, a ram which is displaceable in the casing and a piston which is displaceable relative thereto, determining a first measured value in the unloaded state of the washing machine by measuring a variable which characterises the load, calculating a first suspension force of the at least one suspension element as a function of the first measured value, calculating a first damper force of the at least one damper as a function of the first measured value, determining a second measured value in the loaded state of the washing machine by measuring the variable which characterises the load, calculating a second suspension force of the at least one suspension element as a function of the second measured value, calculating a second damper force of the at least one damper as a function of the second measured value, and calculating the load of the washing machine as a function of the suspension forces and the damper forces. The essence of the invention is that a first measured value is determined in the unloaded state of the washing machine and a second measured value in the loaded state of the washing machine, by measuring a variable which characterises the load, the load of the washing machine being calculated from the measured values. Suspension forces of the at least one suspension element and damper forces of the at least one damper in the unloaded and loaded state of the washing machine are calculated as a function of the measured values, the load being determined by comparison of the suspension forces and the damper forces. The load in the washing machine is calculated as a function of the suspension forces and the damper forces. The method therefore allows simple and precise load determination in the case of dampers having a non-linear characteristic.

The following description relates to a specific type of free-wheel damper. Other types of free-wheel damper can also be used for this method.

Additional features, details and advantages of the invention will emerge from the following description of several embodiments of the invention given with reference to the drawings.

DESCRIPTION OF THE PREFERRED EMBODIMENTS

A first embodiment of the invention is described hereinafter with reference to FIG. 1 to 6. A drum washing machine 1 shown in FIGS. 1 and 2 comprises an oscillatory washing unit 2 with a drive motor 3 which drives a washing drum (not shown in detail) via a belt drive 4 about a drum axis 5. Other components which are connected to the washing unit 2, for example a gear, have been omitted for the sake of clarity. The oscillatory washing unit 2 is suspended by means of two suspension elements 6 configured as tension coil springs, on a washing machine casing 7 which is supported relative to a washing machine frame 8 standing on the ground and is connected thereto. The suspension elements 6 configured as tension coil springs are arranged, at one end, on first suspension eyelets 9 arranged in the upper region of the washing unit 2. At the other, they are suspended on second suspension eyelets 10 configured on the washing machine casing. The washing machine casing 7 is covered by a cover plate 11.

Figure 1:
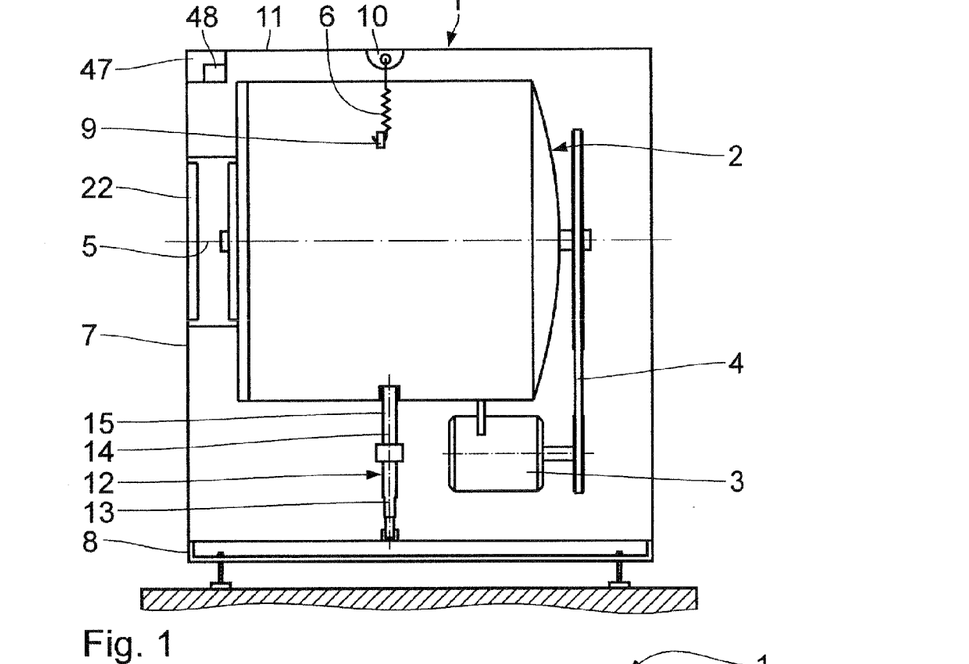
FIG. 1 shows a schematic side elevation of a drum washing machine.
Figure 2:
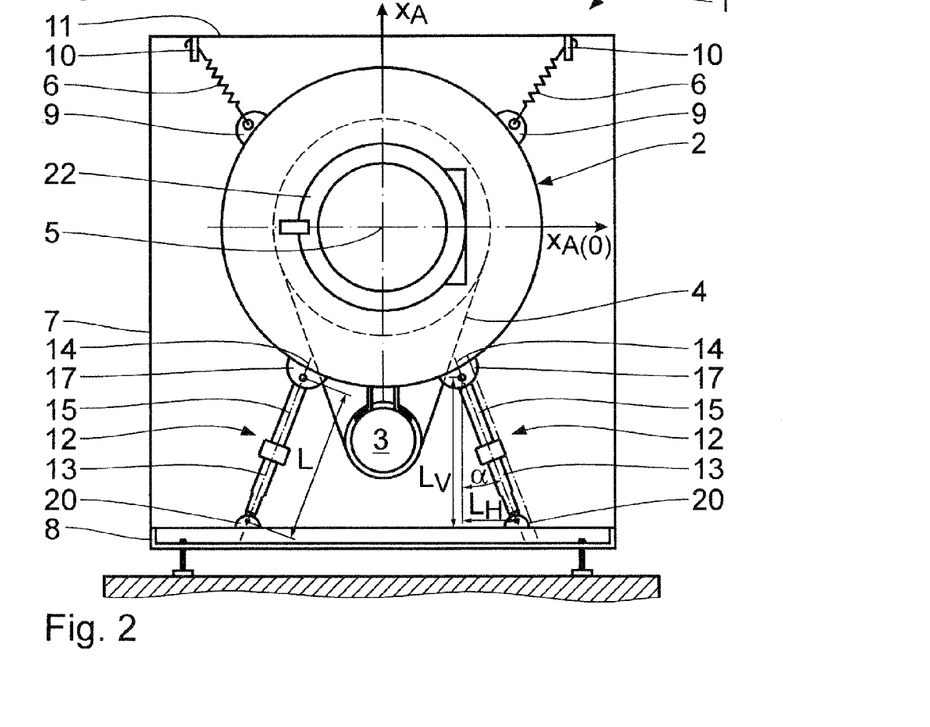
FIG. 2 shows a front elevation of the washing machine according to FIG. 1.
Figure 3:
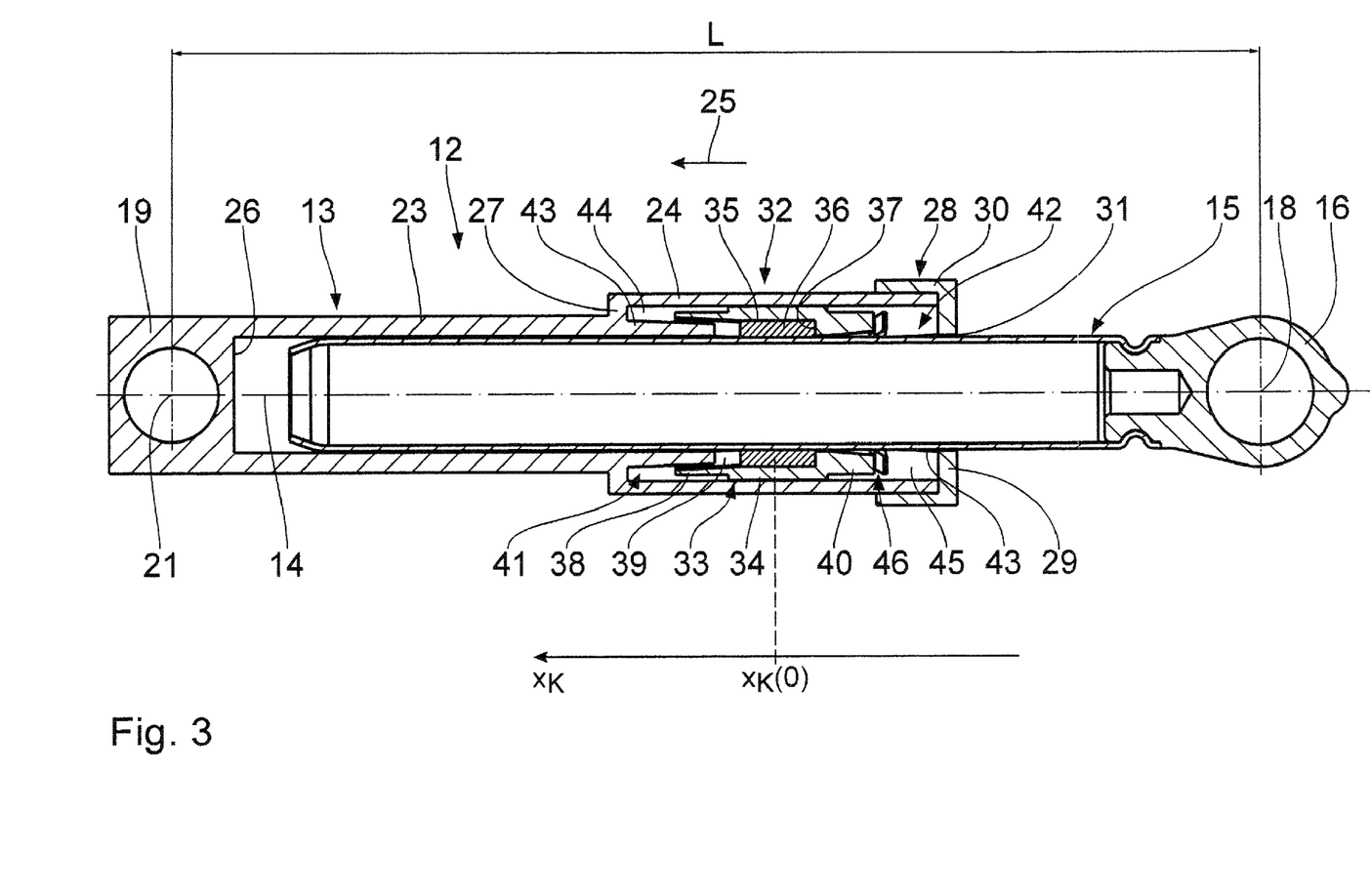
FIG. 3 shows an axial section of a damper of the drum washing machine according to FIG. 1.

Two friction dampers 12 which are connected to the washing machine frame 8 are arranged centrally on the underside of the washing unit 2. Each friction damper 12 comprises a tubular casing 13 with a central longitudinal axis 14 in which a ram 15 is displaceably guided. At its free end, the ram 15 comprises a first fastening element 16 by means of which the friction damper 12 is arranged on a first bearing 17 on the washing unit 2 in such a way that the friction damper 12 is pivotal relative to the washing unit 2 about a first pivot axis 18 parallel to the drum axis 5. At the free end of the casing 13 is arranged a second fastening element 19 by means of which the friction damper 12 is arranged on a second bearing 20 on the washing machine frame 8 in such a way that the friction damper 12 is pivotal relative to the washing machine frame 8 about a second pivot axis 21 parallel to the drum axis 5. Laundry is introduced and removed through a flap 22 arranged on the washing unit 2.

The tubular casing 13 of the friction damper 12 comprises a guide portion 23 and a retainer portion 24 formed integrally therewith. The guide portion 23 follows the retainer portion 24 in an insertion direction 25. The free end of the guide portion 23, which simultaneously forms the free end of the casing 13, is closed by a base 26. The base 26 is formed integrally with the fastening element 19. The guide portion 23 has an internal diameter which is selected in such a way that the ram 15 is guided with minimum play along the insertion direction 25 within the casing 13 and can be displaced without static friction. The internal diameter of the retainer portion 24 is greater than the internal diameter of the guide portion 23. The retainer portion 24 is fastened on the ram-side end of the guide portion 23 by means of an annular stop collar 27. At its end remote from the guide portion 23, the retainer portion 24 is sealed by a closure cap 28. The closure cap 28 has an annular closure cap collar 29 and a tubular fastening portion 30 fastened thereon, the fastening portion 30 extending along the central longitudinal axis 14 and surrounding the retainer portion 24. The end of the retainer portion 24 remote from the guide portion 23 rests against the closure cap collar 29, the closure cap 28 being secured against displacement by means of a catch mechanism (not shown in detail) in the region of the fastening portion 30. The annular closure cap collar 29 forms a closure cap orifice 31 in which the ram 15 is guided with minimal play and friction.

A friction damping unit 32 is arranged inside the casing 13 in the region of the retainer portion 24. The friction damping unit 32 has a piston 33 which is displaceable relative to the casing 13 and to the ram 15 along the central longitudinal axis 14. The piston 13 has a substantially tubular configuration and comprises a centrally located press-on portion 24 in which is arranged a peripheral annual groove 35 facing the ram 15. In the annular groove 35 is arranged an annularly extending resilient friction lining 36 which rests against lateral walls 37 of the annular groove 35 so that it is surrounded in part by the piston 33 and secured against displacement relative to the piston 33. During a relative movement between the ram 15 and the piston 33, the friction lining 36 rubs against the ram 15.

A first stop portion 38 formed integrally with the press-on portion 34 extends from the lateral wall 37 facing the casing 13. The first stop portion 38 has a tubular configuration and does not rest against the retainer portion 24 of the casing 13. Along its internal periphery, the stop portion 38 has a plurality of uniformly spaced longitudinal grooves 39 which extend along the central longitudinal axis 14, taper in the direction of the friction lining 36 and extend to the friction lining 36. The friction lining 36 is therefore exposed in the axial direction in the region of the longitudinal grooves 39. Similarly to the first stop portion 38, a second stop portion 40 extends from the lateral wall 37 facing the ram 15. The second stop portion 40 is constructed similarly to the first stop portion 38 and is formed integrally with the press-on portion 34.

To limit the movement of the piston 33, the friction damping unit 32 has a casing-side first stop element 41 and a ram-side second stop element 42. The first stop element 41 comprises the stop collar 27 and a plurality of stop plungers 43, which extend from the stop collar 27 and along the central longitudinal axis 14. The stop plungers 43 are configured and arranged in such a way that the piston 33 with the longitudinal grooves 39 of the first stop portion 38 can surround the stop plungers 43 so that the piston 33 can be displaced into a first annular space 44 between the retainer portion 24 and the stop plungers 43. The second stop element 42 comprises the closure cap collar 29 and a plurality of stop plungers 43 which are arranged on the closure cap collar 29 and extend along the central longitudinal axis 14. The stop plungers 43 of the second stop element 42, together with the retainer portion 24 of the casing 13, form a second annular space 45 into which the second stop portion 40 of the piston 33 can be displaced. For damping the impact of the piston 33 on the stop collar 27 or the closure cap collar 29 in the case of extremely great oscillation amplitudes, buffers 46 are arranged between the piston 33 and the stop elements 41, 42. Reference is made to DE 10 2005 038 950.3 and DE 10 2005 038 953.8 with respect to the detailed construction of the friction damper 12.

Each friction damper 12 has a damper length L with respect to its pivot axis 18, 21. The friction dampers 12 are arranged obliquely relative to the washing machine frame 8 in order to support the washing unit 2. The friction dampers 12 have a length component which extends vertically relative to the washing machine frame 8 and is described as a vertical damper length $L_V$. The friction dampers 12 also have a length component extending horizontally relative to the washing machine frame 8 which is described as a horizontal damper length $L_H$. Owing to the oblique installation of the friction dampers 12, the damper length L and vertical damper length $L_V$ enclose an angle $\alpha$. The equations:

$$L^2 = L_V^2 + L_H^2 \quad \text{(Eq. 1)}$$

$$L_V = L \cdot \cos \alpha \quad \text{(Eq. 2)}$$

$$L_H = L \cdot \sin \alpha \quad \text{(Eq. 3)}$$

generally apply to damper lengths L, $L_V$, $L_H$.

The drum axis 5 of the washing unit 2 has a vertical position described as the washing unit position $x_A$ relative to the washing machine frame 8. The washing unit position $x_A$ has a positive count in the direction of the arrow shown in FIG. 2. The piston 33 also has a piston position $x_K$ relative to the casing 13 along the central longitudinal axis 14. The piston position $x_K$ has a positive count in the insertion direction 25. In a starting state of the drum washing machine 1, in which it is unloaded and the piston 33 is arranged centrally in the retainer portion 24 along the central longitudinal axis 14, the drum washing machine 1 has the starting values $L=L(0)$, $L_V=L_V(0)$, $L_H=L_H(0)$, $x_A=x_A(0)=0$ mm, $x_K=x_K(0)=0$ mm and $\alpha=\alpha(0)$.

The drum washing machine 1 is provided with a measurement sensor (not shown) for measuring the damper length L. Measurement sensors of this type are known and can be mechanical, electrical, inductive or optical in design.

Figure 4:
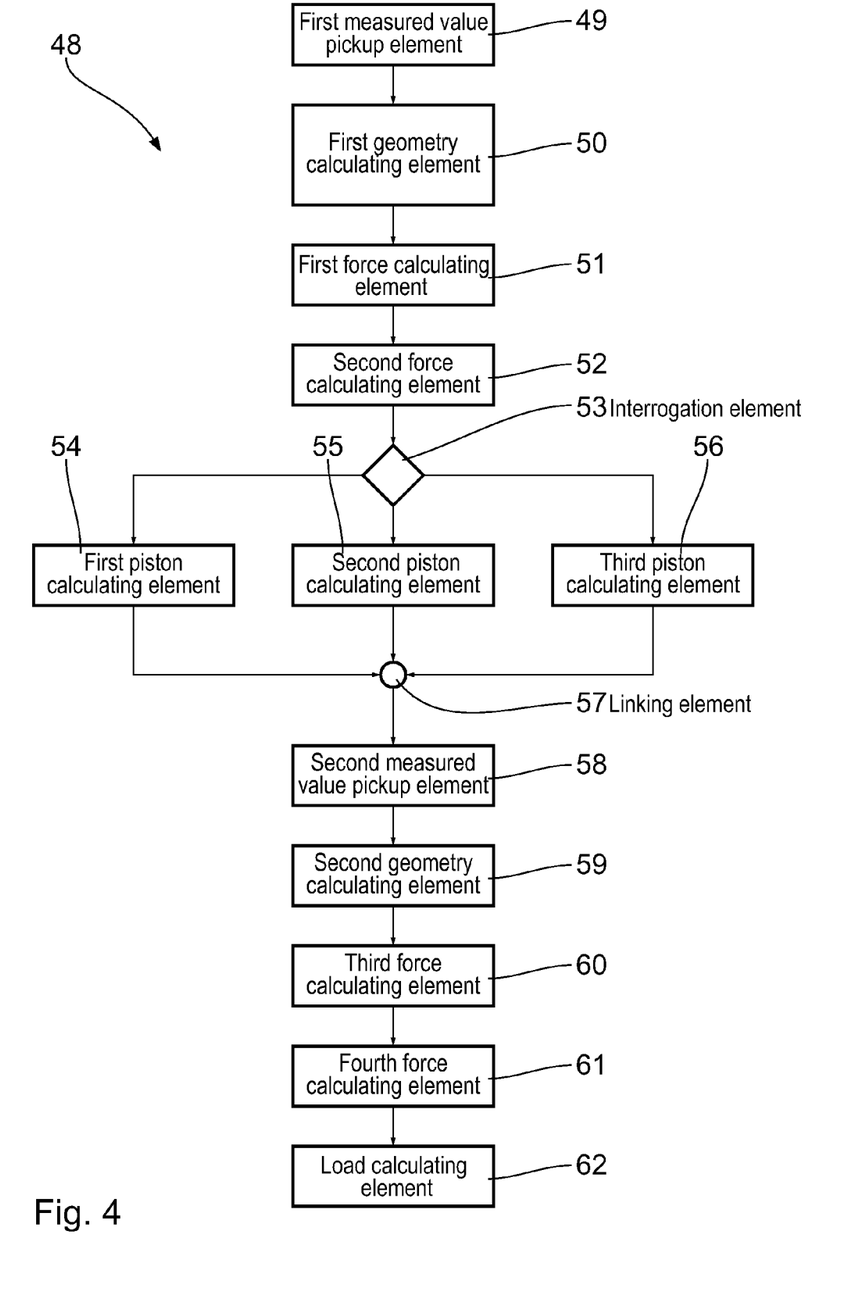
FIG. 4 shows a schematic view of a first embodiment of a load determining unit of the drum washing machine according to FIG. 1.
Figure 5:
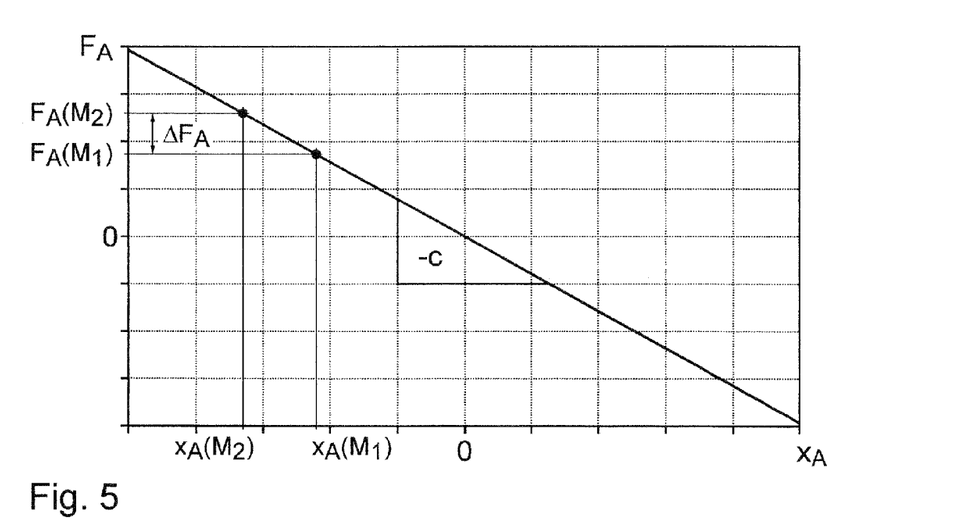
FIG. 5 shows a graph of a suspension element characteristic of a suspension element of the drum washing machine according to FIG. 1.

The drum washing machine 1 has a control unit 47 for controlling the washing process. The control unit 47 comprises a load determining unit 48 which is shown in FIG. 4. The load determining unit 48 has a first measured value pickup element 49 which is followed by a first geometry calculating element 50, a first force calculating element 51 and a second force calculating element 52. The second force calculating element 52 is followed by an interrogation element 53 which is connected to a first piston calculating element 54, a second piston calculating element 55 and a third piston calculating element 56, the signal branches are arranged to be parallel to one another. The piston calculating elements 54, 55, 56 are followed by a linking element 57 in which the signal branches are combined again. The linking element 57 is followed by a second measured value pickup element 58, a second geometry calculating element 59, a third force calculating element 60, a fourth force calculating element 61 and a load calculating element 62. The elements of the load determining unit 48 are mutually connected in terms of signalling and are designed as hardware and/or software.

The mode of operation of the drum washing machine 1 and the load determining unit 48 is described in more detail hereinafter. A first measured value $M_1$ is determined by measuring the damper length L in the unloaded state of the drum washing machine 1. The damper length L represents a variable which characterises the load or the initial tension, caused by the preceding washing cycle. The first measured value $M_1$ is processed by means of the first measured value pickup element 49 so that the measurement provides a first damper length L ($M_1$) in the unloaded state of the drum washing machine 1. The one first damper length L ($M_1$) is presented to the first geometry calculating element 50. The starting values L(0), $L_V(0)$, $L_H(0)$, $x_A(0)$ and $x_K(0)$ are initialised by means of the first geometry calculating element 50. A first vertical damper length $L_V(M_1)$ and a first washing unit position $x_A(M_1)$ are then calculated in the unloaded state of the drum washing machine 1 using the first geometry calculating element 50. The following equations:

$$L_V(M_1) = sqrt(L(M_1)^2 - L_H(0)^2) \quad \text{(Eq. 4)}$$

$$x_A(M_1) = x_A(0) - (L_V(0) - L_V(M_1)) \quad \text{(Eq. 5)}$$

are used for the calculation.

The calculated washing unit position $x_A(M_1)$ is presented to the first force calculating element 51. A first suspension force $F_A(M_1)$ of the suspension elements 6 is calculated using the first force calculating element 51. The first suspension force $F_A(M_1)$ is obtained from a suspension element characteristic $F_A(x_A)$ shown in FIG. 5. The suspension element characteristic $F_A x_A$ describes the relationship between the washing unit position $x_A$ and the suspension force $F_A$. Since the suspension elements 6 are configured as tension coil springs, the suspension element characteristic $F_A(x_A)$ has a linear configuration and has a pitch-c corresponding to the spring constant of the suspension elements 6. The suspension element characteristic $F_A(x_A)$ is stored in the first force calculating element 51, the first suspension force $F_A(M_1)$ being calculated by evaluating the suspension element characteristic $F_A(x_A)$ at the washing unit position $x_A(M_1)$.

The first suspension force $F_A(M_1)$ is presented to the second force calculating element 52. A first damper force $F_D(M_1)$ of the friction damper 12 is calculated by means of the second force calculating element 52. Owing to the force equilibrium between the suspension elements 6 and the friction dampers 12, the first damper force $F_D(M_1)$ is calculated by equating with the negative first suspension force $F_A(M_1)$.

$$F_D(M_1) = -F_A(M_1) \quad \text{(Eq. 6)}$$

Therefore applies to the first damper force $F_D(M_1)$.

Figure 6:
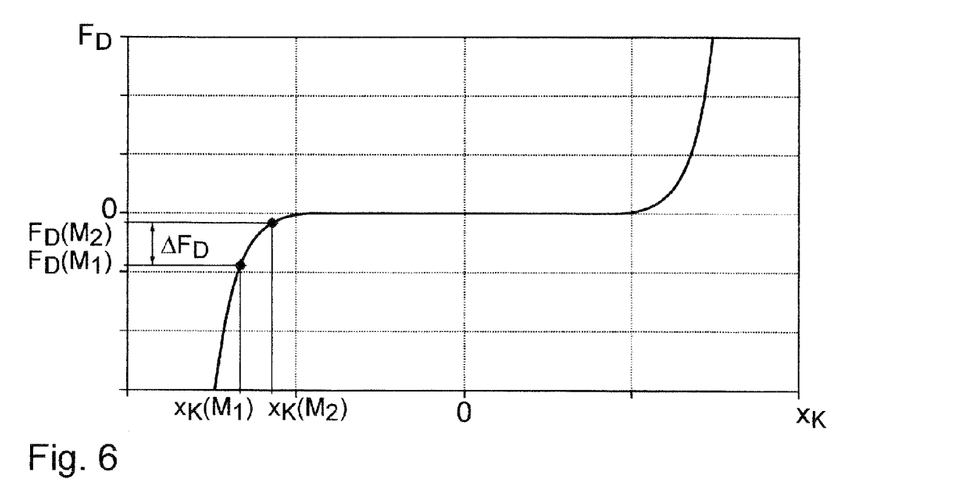
FIG. 6 shows a graph of a damper characteristic of the damper according to FIG. 3.

The first damper force $F_D(M_1)$ is presented to the interrogation element 53. The interrogation element 53 enquires and distinguishes whether the first damper force $F_D(M_1)<0$, $F_D(M_1)=0$ or $F_D(M_{1+})>0$ applies. If the first damper force $F_D(M_1)<0$, the first damper force $F_D(M_1)$ is presented to the first piston calculating element 54. A first piston position $x_K(M_1)$ is calculated using the first piston calculating element 54. Calculation is carried out using a damper characteristic $F_D(x_K)$ which describes the relationship between the piston position $x_K$ and the damper force $F_D$ and is shown in FIG. 6. The damper characteristic $F_D(x_K)$ is stored in the first piston calculating element 54. The first piston position $x_K(M_1)$ is calculated by evaluating the damper characteristic $F_D(x_K)$ in the place of the first damper force $F_D(M_1)$. The damper characteristic $F_D(x_K)$ of the friction dampers 12 has been determined in advance. The case where the first damper force $F_D(M_1)<0$ is the general case and exists predominantly if a large load has previously been washed in the drum washing machine 1 and the piston 33 is pretensioned against the second stop element 42 after removal of the load.

If the first damper force $F_D(M_1)=0$, this is presented to the second piston calculating unit 55. Since the piston 33 does not rest against the first stop element 41 or against the second stop element 42 in this case, the piston position $x_K$ between the stop elements 41, 42 is not defined clearly by the first damper force $F_D(M_1)$. This case exists predominantly when a small to average load has previously been washed in the drum washing machine 1. In this case, the first piston position $x_K(M_1)$ is assumed to be $x_K(0)$.

If the first damper force $F_D(M_1)>0$, this is presented to the third piston calculating element 56. In this case, calculation of the first piston position $x_K(M_1)$ takes place analogously to calculation in the first piston calculating element 54. The case where the first damper force $F_D(M_1)>0$ generally does not occur. In this case, the piston 33 is pressed against the first stop element 41. The linking element 57 transmits the calculated forces, lengths and positions to the subsequent elements.

Once the drum washing machine 1 has been loaded with laundry, the drum washing machine 1 is in a loaded state. The weight of the laundry is designated as load B. A second measured value $M_2$ is determined by measuring the damper length L in the loaded state of the drum washing machine 1.

The second measured value $M_2$ is processed by means of the second measured value pickup element 58 so that the measurement provides a second damper length L ($M_2$) in the loaded state of the drum washing machine 1. The second damper length L ($M_2$) characterises the load B of the drum washing machine 1.

The second damper length L ($M_2$) is presented to the second geometry calculating element 59. A second vertical damper length $L_V(M_2)$ and a second washing unit position $x_A(M_2)$ is calculated in accordance with equations 4 and 5 using the second geometry calculating element 59.

The second washing unit position $x_A(M_2)$ is presented to the third force calculating element 60. A second suspension force $F_A(M_2)$ is calculated in accordance with the first force calculating element 51 using the third force calculating element 60. A change in suspension force $\Delta F_A = F_A(M_2) - F_A(M_1)$ is calculated using the third force calculating element 60. The change in suspension force $\Delta F_A$ is the difference between the second suspension force $F_A(M_2)$ and the first suspension force $F_A(M_1)$. The change in suspension force $\Delta F_A$ is presented to the fourth force calculating element 61 and the load calculating element 62.

A second piston position $x_K(M_2)$ is firstly calculated by means of the fourth force calculating element 61. The second piston position $x_K(M_2)$ is calculated in accordance with the following equation:

$$x_K(M_2) = x_K(M_1) - (L(M_2) - L(M_1)) \quad \text{(Eq. 7)}$$

A second damper force $F_D(M_2)$ can be calculated from the damper characteristic $F_D x_K$ using the second piston position $x_K(M_2)$. For this purpose, the damper characteristic $F_D x_K$ is evaluated at the second piston position $x_K(M_2)$. The evaluation produces the second damper force $F_D(M_2)$. A change in damper force $\Delta F_D = F_D(M_2) - F_D(M_1)$ is also calculated using the fourth force calculating element 61. The change in damper force $\Delta F_D$ is obtained as the difference between the calculated second damper force $F_D(M_2)$ and the first damper force $F_D(M_1)$. The change in damper force $\Delta F_D$ is also presented to the load calculating element 62.

The load B of the drum washing machine 1 is calculated using the load calculating element 62. The load B is calculated according to the following equation:

$$B = N \cdot (\Delta F_A + \Delta F_D) \quad \text{(Eq. 8)}$$

The load B is obtained from the sum of the change in the suspension force $\Delta F_A$ and the change in the damper force $\Delta F_D$, the sum being multiplied by the number N=2 of suspension elements 6 and friction dampers 12. The washing process of the drum washing machine 1 is controlled as a function of the calculated load B. Reference is made to DE 10 2005 038 950.3 and DE 10 2005 038 953.8 with respect to the precise mode of operation of the drum washing machine 1 and the friction dampers 12.

The example of calculation is based on a configuration of the drum washing machine with two suspension springs and two dampers. The formulae would have to be adapted accordingly for other configurations (more dampers and suspension springs, also an odd number).

Since the load B of the drum washing machine 1 is calculated as a function of the change in suspension force $\Delta F_A$ and the change in the damper force $\Delta F_D$, the load can also be reliably detected also with a free wheeling damper and a non-linear characteristic.

Alternatively, the interrogation element 53 can be configured in such a way that interrogation takes place not as a function of the first damper force $F_D(M_1)$ but as a function of the first suspension force $F_A(M_1)$ or the first washing unit position $x_A(M_1)$.

Figure 7:
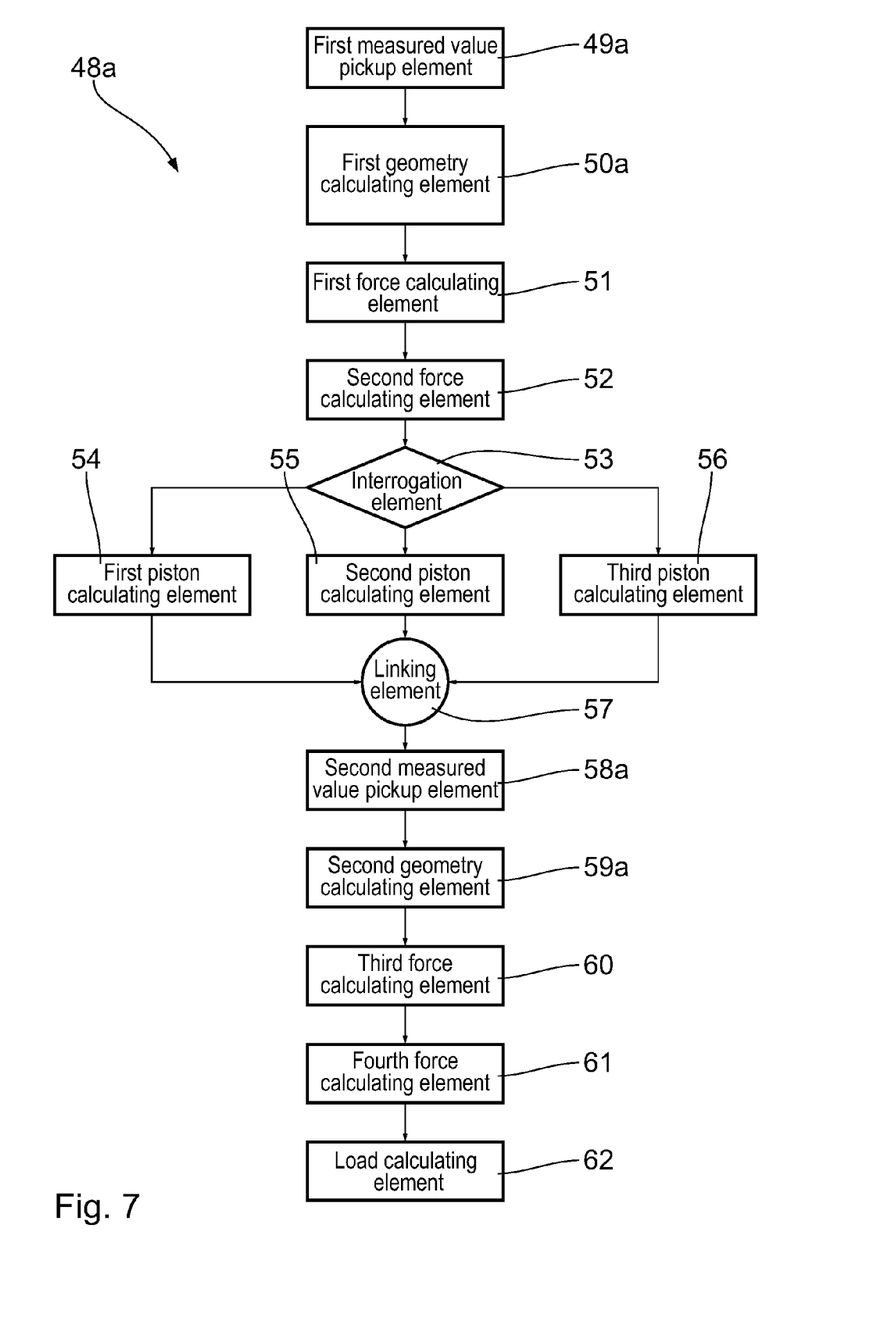
FIG. 7 shows a schematic view of a second embodiment of a load determining unit of the drum washing machine according to FIG. 1.

A second embodiment of the invention is described hereinafter with reference to FIG. 7. Parts which are identical in design receive the same reference numerals as in the first embodiment, reference being made to the description thereof. Parts which are different in design but are functionally similar receive the same reference numerals with a suffix a. The essential difference from the first embodiment resides in the configuration of the measured value pickup elements 49a, 58a and the geometry calculating elements 50a, 59a. The first measured value $M_1$ and the second measured value $M_2$ is determined by measuring the washing unit position $x_A$. In this embodiment, the washing unit position $x_A$ represents a variable which characterises the bias caused by the preceding washing cycle. For measuring the washing unit position $x_A$, the measurement sensor is arranged in the region of the drum axis 5. The measurement sensor measures the vertical displacement of the drum axis 5 and therefore the washing unit position $x_A$. The measurement sensor can be mechanical, electrical, inductive or optical in design.

The first measured value pickup element 49a processes the measured value $M_1$ and transmits the measured first washing unit position $x_A(M_1)$ to the first geometry calculating element 50a. The first vertical damper length $L_V(M_1)$ and the damper length $L(M_1)$ are calculated in accordance with the transformed equations 4 and 5 using the first geometry calculating element 50a. The measured second washing unit position $x_A(M_2)$ is presented to the second geometry calculating element 59a in a corresponding manner using the second measured value pickup element 58a. The second vertical damper length $L_V(M_2)$ and the second damper length $L(M_2)$ are calculated in accordance with the first geometry calculating element 50a using the second geometry calculating element 59a. Reference is made to the first embodiment with respect to the further mode of operation of the drum washing machine 1 and the load determining unit 48a.

What is claimed is:

1. A method for simple and precise determining the load in a washing machine, comprising the steps of:
   a. providing a washing machine (1), with
      i. a washing machine casing (7) and a washing unit (2),
      ii. at least one suspension element (6) for the oscillatory fastening of the washing unit (2) on the washing machine casing (7), and
      iii. at least one damper (12) having a non-linear damping characteristic for damping the movement of the washing unit (2), the at least one damper (12) comprising a casing (13), a ram (15) which is displaceable in the casing (13) and a piston (33) which is displaceable relative thereto,
   b. determining a first measured value (M1) in the unloaded state of the washing machine (1) by measuring a variable which characterizes the load (B),
   c. calculating a first suspension force (FA (M1)) of the at least one suspension element (6) as a function of the first measured value (M1),
   d. calculating a first damper force (FD (M1)) of the at least one damper (12) as a function of the first measured value (M1),
   e. determining a second measured value (M2) in the loaded state of the washing machine (1) by measuring the variable which characterizes the load (B),
   f. calculating a second suspension force (FA (M2)) of the at least one suspension element (6) as a function of the second measured value (M2),
   g. calculating a second damper force (FD (M2)) of the at least one damper (12) as a function of the second measured value (M2), and
   h. calculating the load (B) of the washing machine (1) as a function of the suspension forces (FA (M1), FA (M2)) and the damper forces (FD (M1), FD (M2)).

2. A method according to claim 1, wherein the variable which characterizes the load (B) is a damper length (L) of the at least one damper (12).

3. A method according to claim 1, wherein a respective washing unit position (xA (M1), xA (M2)) of the washing unit (2) is calculated as a function of the measured values (M1, M2).

4. A method according to claim 1, wherein the variable which characterizes the load (B) is a washing unit position (xA) of the washing unit (2).

5. A method according to claim 1, wherein a respective damper length (L (M1), L (M2)) of the at least one damper (12) is calculated as a function of the measured values (M1, M2).

6. A method according to claim 1, wherein the first damper force (FD (M1)) is calculated by equating with the negative first suspension force (FA (M1)).

7. A method according to claim 1, wherein a first piston position (xK (M1)) of the piston (33) is calculated as a function of the first suspension force (FA (M1)) or the first damper force (FD (M1)).

8. A method according to claim 7, wherein the first piston position (xK (M1)) is calculated as a function of a damper characteristic (FD (xK)) of the at least one damper (12).

9. A method for simple and precise determining the load in a washing machine, comprising the steps of:
   a. providing a washing machine (1), with
      i. a washing machine casing (7) and a washing unit (2),
      ii. at least one suspension element (6) for the oscillatory fastening of the washing unit (2) on the washing machine casing (7), and
      iii. at least one damper (12) with a non-linear characteristic for damping the movement of the washing unit (2), the at least one damper (12) comprising a casing (13), a ram (15) which is displaceable in the casing (13) and a piston (33) which is displaceable relative thereto,
   b. determining a first measured value (M1) in the unloaded state of the washing machine (1) by measuring a variable which characterizes the load (B),
   c. calculating a first suspension force (FA (M1)) of the at least one suspension element (6) as a function of the first measured value (M1),
   d. calculating a first damper force (FD (M1)) of the at least one damper (12) as a function of the first measured value (M1), e. determining a second measured value (M2) in the loaded state of the washing machine (1) by measuring the variable which characterizes the load (B),
f. calculating a second suspension force (FA (M2)) of the at least one suspension element (6) as a function of the second measured value (M2),
g. calculating a second damper force (FD (M2)) of the at least one damper (12) as a function of the second measured value (M2), and
h. calculating the load (B) of the washing machine (1) as a function of the suspension forces (FA (M1), FA (M2)) and the damper forces (FD (M1), FD (M2)),
  i. wherein the second damper force ($F_D$ ($M_2$)) is calculated as a function of a second piston position ($x_K$ ($M_2$)) of the piston (33) and a damper characteristic ($F_D$ ($x_K$)) of the at least one damper (12) having a non-linear damping characteristic.

10. A method for simple and precise determining the load in a washing machine, comprising the steps of:
a. providing a washing machine (1), with
  i. a washing machine casing (7) and a washing unit (2),
  ii. at least one suspension element (6) for the oscillatory fastening of the washing unit (2) on the washing machine casing (7), and
  iii. at least one damper (12) with a non-linear characteristic for damping the movement of the washing unit (2), the at least one damper (12) comprising a casing (13), a ram (15) which is displaceable in the casing (13) and a piston (33) which is displaceable relative thereto,
b. determining a first measured value (M1) in the unloaded state of the washing machine (1) by measuring a variable which characterizes the load (B),
c. calculating a first suspension force (FA (M1)) of the at least one suspension element (6) as a function of the first measured value (M1),
d. calculating a first damper force (FD (M1)) of the at least one damper (12) as a function of the first measured value (M1),
e. enquiring the calculated first damper force (FD (M1)) with an interrogation element (53),
f. distinguishing whether the calculated first damper force (FD (M1)) is smaller than, equal to or bigger than zero with the interrogation element (53),
g. presenting the first damper force (FD (M1)) to a calculating element (54; 55; 56) depending on the value of the calculated first damper force (FD (M1)),
h. determining a second measured value (M2) in the loaded state of the washing machine (1) by measuring the variable which characterizes the load (B),
i. calculating a second suspension force (FA (M2)) of the at least one suspension element (6) as a function of the second measured value (M2),
j. calculating a second damper force (FD (M2)) of the at least one damper (12) as a function of the second measured value (M2), and
k. calculating the load (B) of the washing machine (1) as a function of the suspension forces (FA (M1), FA (M2)) and the damper forces (FD (M1), FD (M2)).

11. A method for determining the load in a washing machine, comprising the steps of:
a. providing a washing machine (1), with
  i. a washing machine casing (7) and a washing unit (2),
  ii. at least one suspension element (6) for the oscillatory fastening of the washing unit (2) on the washing machine casing (7), and
  iii. at least one damper (12) having a non-linear damping characteristic for damping the movement of the washing unit (2), the at least one damper (12) comprising a casing (13), a ram (15) which is displaceable in the casing (13) and a piston (33) which is displaceable relative thereto,
b. determining a first measured value (M1) in the unloaded state of the washing machine (1) by measuring a variable which characterises the load (B),
c. calculating a first suspension force (FA (M1)) of the at least one suspension element (6) as a function of the first measured value (M1),
d. calculating a first damper force (FD (M1)) of the at least one damper (12) as a function of the first measured value (M1),
e. determining a second measured value (M2) in the loaded state of the washing machine (1) by measuring the variable which characterises the load (B),
f. calculating a second suspension force (FA (M2)) of the at least one suspension element (6) as a function of the second measured value (M2),
g. calculating a second damper force (ED (M2)) of the at least one damper (12) as a function of the second measured value (M2), and
h. calculating the load (B) of the washing machine (1) as a function of the suspension forces (FA (M1), FA (M2)) and the damper forces (ED (M1), ED (M2)),
  i. wherein the sum of the difference between the suspension forces (Δ FA) and the difference between the damper forces (ΔFD) is formed for calculating the load (B).

12. A method according to claim 11, wherein the load (B) is reliably detected with the at least one damper (12) having a non-linear characteristic.

13. A method according to claim 10, wherein the first damper force ($F_D$ ($M_1$)) is presented to the calculating element (54), if the first damper force ($F_D$ ($M_1$)) is smaller than zero.

14. A method of claim 13, wherein a first piston position ($x_K$ ($M_1$)) is calculated using the calculating element (54), wherein said calculation is carried out using a damper characteristic ($F_D$ ($x_K$)), which describes the relationship between the piston position ($x_K$) and the damper force ($F_D$).

15. A method of claim 14, wherein the damper characteristic ($F_D$ ($x_K$)) is stored in the calculating element (54).

16. A method of claim 15, wherein the first piston position ($x_K$ ($M_1$)) is calculated by evaluating the damper characteristic ($F_D$ ($x_K$)) in the place of the first damper force ($F_D$ ($M_1$)).

17. A method of claim 16, wherein the damper characteristic ($F_D$ ($x_K$)) of the at least one damper (12) is determined in advance.

18. A method of claim 10, wherein the first damper force ($F_D$ ($M_1$)) is presented to the calculating element (55), if the first damper force ($F_D$ ($M_1$)) is equal to zero.

19. A method of claim 18, wherein the first piston position ($x_K$ ($M_1$)) is assumed to be a starting value of the piston position ($x_K$ (0)).

20. A method of claim 10, wherein the first damper force ($F_D$ ($M_1$)) is presented to the calculating element (56), if the first damper force ($F_D$ ($M_1$)) is greater than zero.

21. A method of claim 20, wherein a first piston position ($x_K$ ($M_1$)) is calculated using the calculating element (56), wherein said calculation is carried out using a damper characteristic ($F_D$ ($x_K$)), which describes the relationship between the piston position ($x_K$) and the damper force ($F_D$).

* * * * *